(No Model.)
E. L. HOWARD.
DRIVING SPRING FOR NAILING MACHINES.
No. 434,274. Patented Aug. 12, 1890.
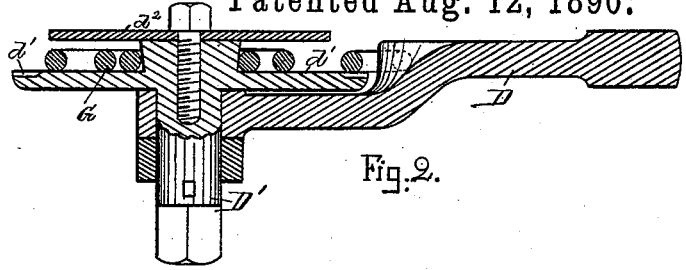
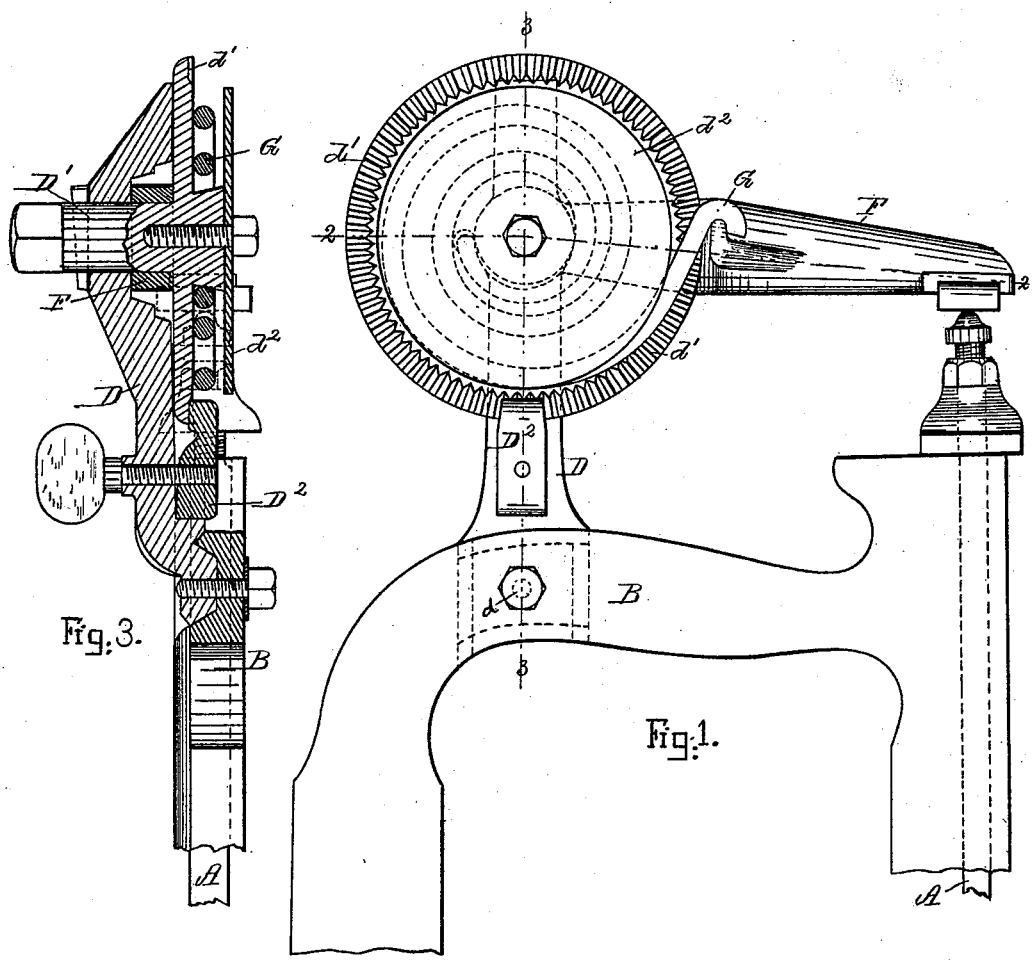
Witnesses.
Inventor.
Elijah Leavitt Howard
by his attorneys
Maynadier & Beach

UNITED STATES PATENT OFFICE.

ELIJAH L. HOWARD, OF HINGHAM, ASSIGNOR TO THE CORRUGATED WIRE FASTENING COMPANY, OF BOSTON, MASSACHUSETTS.

DRIVING-SPRING FOR NAILING-MACHINES.

SPECIFICATION forming part of Letters Patent No. 434,274, dated August 12, 1890.

Application filed January 30, 1890. Serial No. 338,673. (No model.)

*To all whom it may concern:*

Be it known that I, ELIJAH LEAVITT HOWARD, of Hingham, in the county of Plymouth and State of Massachusetts, have invented a new and useful Driver-Spring for Boot or Shoe Nailing-Machines and the like, of which the following is a specification, reference being had to the accompanying drawings, in which—

Figure 1 is a side elevation of a portion of a machine for driving metallic fastenings into soles with my driver-spring attached. Fig. 2 is a section on line 2 2, and Fig. 3 a section on line 3 3, of Fig. 1.

In sole-nailing machines and pegging-machines the driver-bar (marked A in the drawings) is usually lifted by a cam and thrown down by a spring, and a large variety of driver-springs have been used with this class of machines; but hitherto such springs have either been too costly or else too short-lived, and the object of my invention is to provide a driver-spring for this class of machines which while simple and cheap to construct is yet efficient, not likely to give out, and easily adjusted to regulate the force of the blow.

My invention consists in a helical spring, its adjustable carrier, and a lever, so combined that one end of the spring engages with the lever while the other end is fast to the adjustable carrier.

In the drawings, A is the driver-bar and B the head and arm of a sole-nailing machine of ordinary construction.

The spring-carrier is composed of three parts, one of which is a stand D, adapted to be secured—as by a screw $d$—to the arm B of the sole-nailing machine; the second a shaft D', provided with a flange $d'$, which is roughened or toothed, as shown, and the third a clamp $D^2$, which engages with the toothed portion of the flange $d'$ to hold the spring G under the desired tension. The plate $d^2$ is a cover for the spring G, and while not essential is yet desirable. The stand D is bored to receive the shaft D', which is made square at one end for the wrench used in setting up the spring to the desired tension. The cover $d^2$ is connected by a screw to the other end of shaft D'. The spring G is hooked, and at its inner end hooks into a hole made in the flange $d'$, as shown in dotted lines in Fig. 1, while at its outer end it hooks over the lever F. The lever F is fulcrumed on shaft D', as clearly shown in Fig. 2, and bears at its outer end upon the head of the driver-bar A. After the stand D is secured to the arm B, with the lever F extending over the head of the driver-bar A, the clamp $D^2$ is loosened and a wrench applied to the square end of the shaft D', by which the shaft D', and with it the flange $d'$ fast to it, is turned, carrying with it the inner end of spring G, hooked into flange $d'$, the outer end of spring G being held stationary by its hook engaging with the lever F. After the proper tension is then given to the spring G the clamp $D^2$ is caused to grip the toothed part of flange $d'$, thus rigidly connecting together stand D, shaft D', flange $d'$, and the inner end of spring G. After having been thus adjusted the upward motion of the driver-bar A lifts the outer end of lever F, and thereby moves the outer end of spring G, so that the reaction of spring G (when the driver-bar A is released by its lifting-cam) throws the lever F down, and thereby actuates the driving-bar. The lever F not only enables a helical spring to be used, but also diminishes the motion of the free end of the spring and insures the quick stroke which the driver-bar requires.

What I claim as my invention is—

In a nailing or like machine, the combination of a stand D, shaft D', with its roughened flange $d'$, clamp $D^2$, spring G, and lever F, stand D, shaft D', with its flange $d'$, and clamp $D^2$, engaging the roughened portion of flange $d'$, making up an adjustable carrier for spring G, one end of which engages lever F and the other end the said carrier, all substantially as and for the purpose set forth.

E. L. HOWARD.

Witnesses:
J. E. MAYNADIER,
JOHN R. SNOW.